Figure 1:
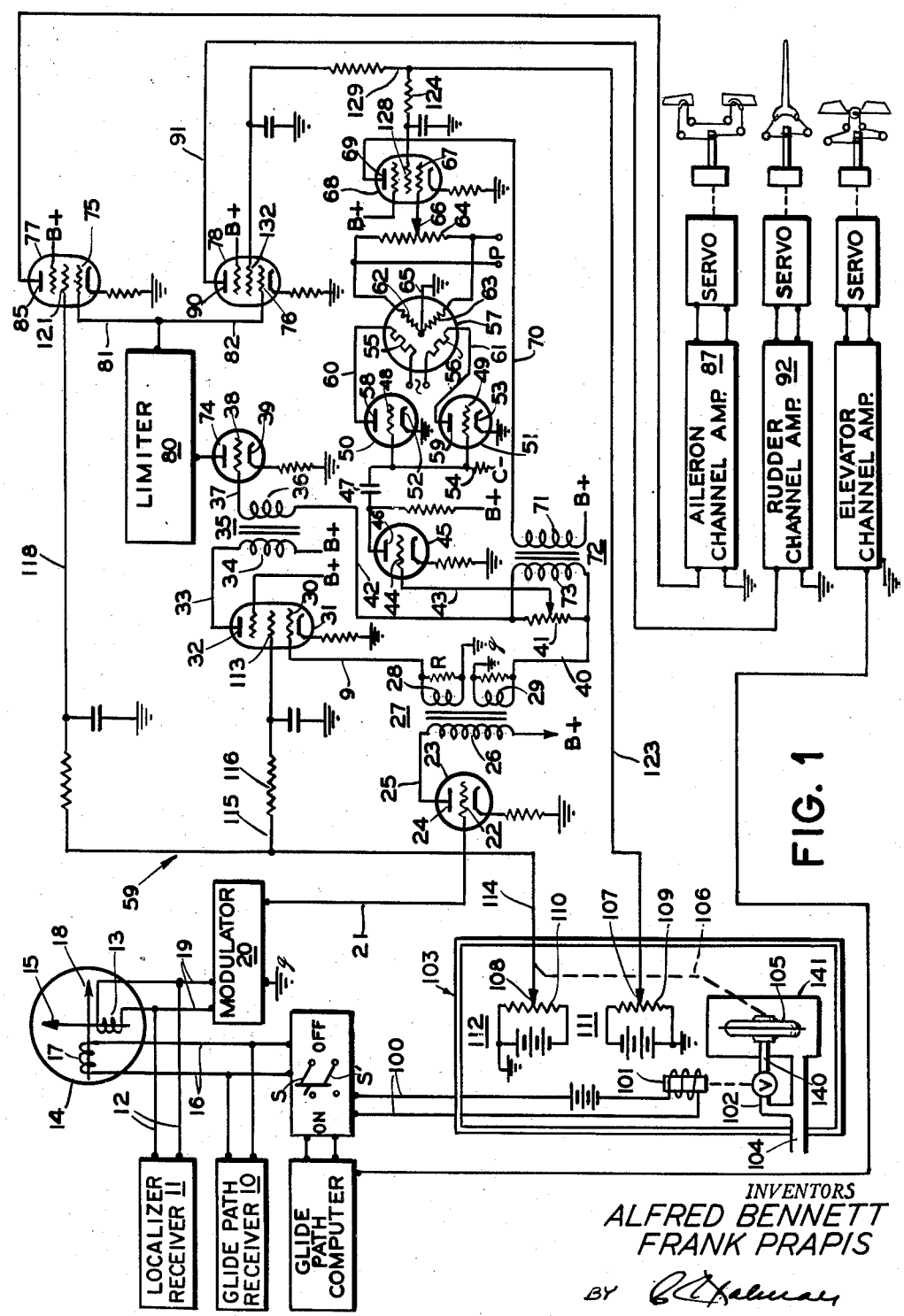

INVENTORS
ALFRED BENNETT
FRANK PRAPIS

ATTORNEY

INVENTORS
ALFRED BENNETT
FRANK PRAPIS
ATTORNEY

United States Patent Office 2,830,777
Patented Apr. 15, 1958

2,830,777

AUTOMATIC STEERING APPARATUS FOR MOBILE VEHICLES

Alfred Bennett, New York, N. Y., and Frank Prapis, Paterson, N. J., assignors to Bendix Aviation Corporation, Teterboro, N. J., a corporation of Delaware Application November 23, 1951, Serial No. 257,804

21 Claims. (Cl. 244—77)

This invention relates generally to beam guidance systems for aircraft or other mobile vehicles and more particularly to systems wherein the control signals for directing the aircraft or other mobile vehicles toward a preselected destination are modified in a predetermined manner as the desired destination is approached.

Beam guidance systems heretofore known developed one or more control signals to assure coordinated craft turns toward the beam in response to departures from the beam. While these systems performed their intended functions well, there was the inherent disadvantage that as the craft approached the landing strip any deviation from the guidance beam produced not only a yaw maneuver but also a roll maneuver which is undesirable at this critical stage of the landing operation. The present invention contemplates the provision of novel apparatus whereby the former disadvantage is overcome and as the craft approaches the landing strip the roll maneuver is substantially eliminated.

An object of the present invention, therefore, is to provide a novel beam guidance system for mobile craft.

Another object of the invention is to provide a novel manner for automatically changing the normal coordination in the controls of the aircraft or other mobile body in response to changes in atmospheric or other pressures to permit the craft to be guided along a predetermined radio path.

A further object is to provide a novel beam guidance means for causing an aircraft or other mobile body to define an approximate linear path toward a selected target or other objective and for any deviation from this path to execute increasingly flat turns as the objective is approached.

Another object is to decrease automatically the banking of the aircraft and to increase automatically the flatness of its turns as the aircraft approaches the airstrip under the control of a radiant energy guidance system.

Another object of the invention is to provide a beam guidance system that will operate for any landing base regardless of its elevation.

A further object is to provide for the control of an electrical circuit by ambient pressure conditions.

The heretofore known systems employing automatic controls to land aircraft under radio guidance conditions presented several disadvantages. Since the automatic pilot controlled the aircraft, it coordinated both aileron and rudder to give a smoothly banked or rolling turn for any necessary lateral deviation to bring the ship back on course. This becomes increasingly hazardous as the ship approaches the ground. It may cause a wing to drag or dig into the ground, particularly as a period of time is necessary to raise and lower the wings of large aircraft. Further an extreme psychological reaction is aroused in the passengers aboard the aircraft when at low altitude, they see a wing dip toward the ground. On the other hand, for greater flying efficiency and maneuverability, it is important that the aircraft should execute smoothly banked turns at all safe altitudes.

Furthermore, the only information which the flight path or horizontal beam of the heretofore known navigation systems imparts to the autopilot is the angle between the lines from the craft to the transmitter and the axis of the beam, and not the lateral distance of the craft from the axis of a beam, regardless of the distance from the transmitter. As the craft approaches the landing field, the sensitivity of the system changes, since the same angular error from the beam axis near to the landing field represents a smaller actual distance from the beam than the same angular error does farther away from the field. Hence, it takes the craft less time to reach the beam from a given angular displacement close to the field than it does when the craft is some distance away from the field. In order to obtain proper control all along the flight path, it is necessary to continuously vary the ratio between the control applied and the angular error calling for the control in accordance with the distance from the field.

A still further object of the present invention therefore, is to automatically adjust the sensitivity of the autopilot as it approaches the field.

Another object is to maintain a constant signal input level for a given displacement from the flight path to the autopilot despite the increasing amplitude and strength of the signal upon approach to the transmitting station.

A further object is to increase the damping action of the autopilot control to decrease the oscillation or hunting action of the aircraft with respect to the flight path beam as it nears the transmitting station.

The foregoing and other objects and advantages of the invention will appear more fully hereinafter from a consideration of the detailed description which follows, taken together with the accompanying drawings wherein several embodiments of the invention are illustrated. It is to be expressly understood, however, that the drawings are for purposes of illustration and description only, and are not designed as a definition of the limits of the invention, reference being had to the appended claims for this purpose.

Figure 2:
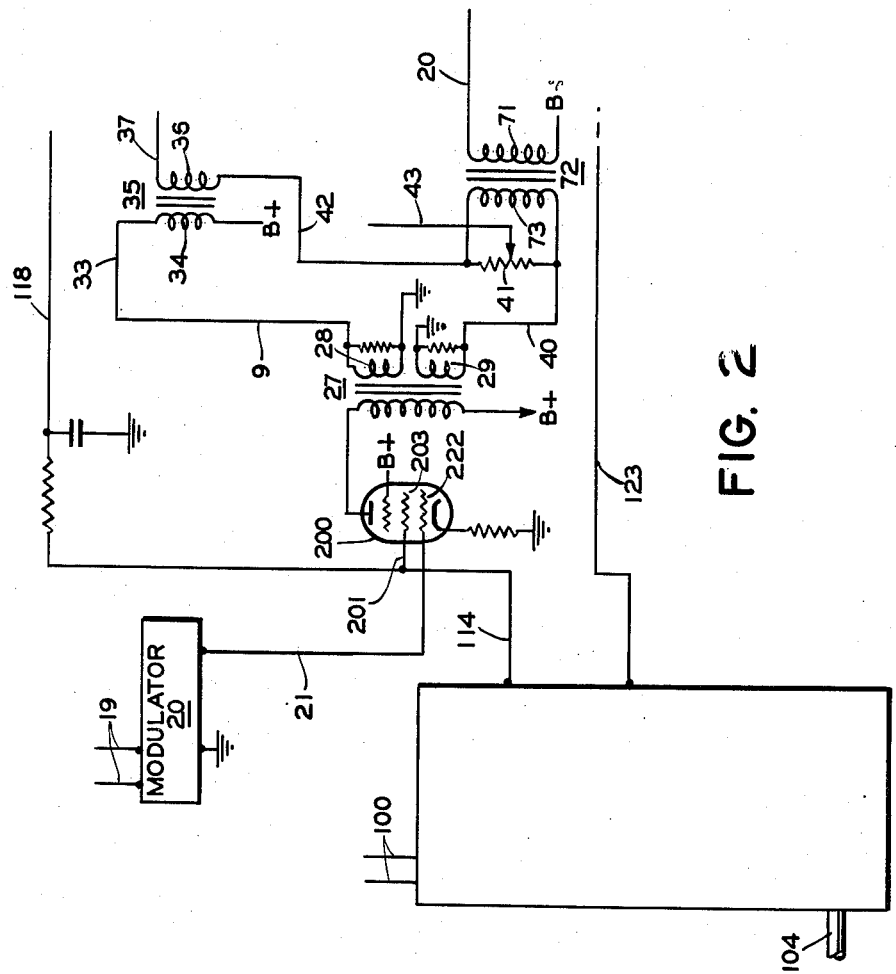

In the drawings, wherein like reference characters refer to like parts throughout the several views:

Fig. 1 is a circuit diagram illustrating the various connections of one embodiment of the novel automatic landing system of the present invention; and Fig. 2 shows another embodiment of the novel automatic landing system shown in Fig. 1.

The novel navigation system, though not confined to it, is adapted to operate with conventional localizer and glide path transmitters. The localizer and glide path transmitters are generally at the far end of the runway to which the craft is headed, the localizer controlling the craft in respect to the horizontal plane and the glide path transmitter in respect to the vertical plane.

The conventional equipment used for instrument landing is shown as receiver 10 for receiving vertical guidance signals from the glide path transmitter and receiver 11 for receiving lateral signals from the localizer transmitter. In a known manner, receiver 11 develops at its output a direct current of one polarity, assuming the craft to be to the left of the localizer beam, and of an opposite polarity when the craft is to the right of the localizer beam. Such direct current is communicated from the output of receiver 11 by way of conductors 12 to energize coil 13 of a conventional cross pointer indicator 14, a vertical pointer 15 being inductively coupled with the coil to move in a clockwise direction from a normally central vertical position when the craft is to the left of the localizer beam and in a counterclockwise direction when the craft is to the rgiht of the localizer beam, it being understood that the pointer 15 maintains a normally centered vertical position when the craft is directly on the localizer beam at which time no current flows in coil 13.

In a manner similar to that discussed above, the glide path receiver also energizes the glide path computer which controls the elevator when it is engaged. Similarly, the localizer receiver energizes the flight path computer, designated generally at 59, which controls the rudder and ailerons. The details and operation of these computers have been more fully described and claimed in application Serial No. 705,524, filed October 25, 1946, now U. S. Patent No. 2,592,173 and assigned to the assignee of the present invention.

Referring now to Fig. 1 of the drawings, the novel steering apparatus is illustrated generally in a schematic manner for better understanding. Localizer receiver 11 is connected by way of leads 12 and 19 to modulator 20 which may be of a conventional type for developing an A. C. signal output in accordance with a D. C. input. A description of one such modulator appears in copending application Serial No. 700,234 and now matured into Patent No. 2,678,419 issued May 11, 1954 to Alfred Bennett et al. assigned to the assignee of the present invention and to which reference is made for details of operation and structure.

One lead from modulator 20 is grounded at g, the other lead 21 is connected to the grid 22 of an amplifier tube 23. Plate 24 is connected by lead 25 to primary winding 26 of an input transformer 27 having a pair of secondary windings 28 and 29. Each of the secondary windings is grounded at g and a resistance R is connected across each winding. This transformer has been illustrated as having two secondary windings merely for clarity. Obviously, a center tap transformer will operate just as well.

The secondary winding 28 by way of conductor 9 is connected to grid 30 of a thermionic tube 31 having plate 32 connected by way of conductor 33 to the primary winding 34 of a mixing transformer 35. The secondary winding 36 is connected at one end by way of conductor 42 to the variable tapped resistance 41, then by way of conductor 40 to one end of the secondary winding 29 of input transformer 27.

Connected across resistance 41 is the secondary winding 73 of a feed back transformer 72. The one end of the primary winding 71 is connected to the positive terminal B+ of a suitable D. C. source whereas the other end thereof is connected to plate 69 of a vacuum tube 68 whose grid 67 is attached by tap 66 across the output diagonal of the bridge defined by the grounded connection 65 and the junction of tap 66 engaging with resistor 64. The bridge is connected across a suitable source of supply by way of conductors P, the latter being so arranged that upon unbalance of the bridge the voltage across grounded conductor 65 and tap 66 will be in phase opposition to the phase of the displacement signal communicated to secondary winding 73 of transformer 72 by way of secondary 29 of the input transformer 27.

Resistors 62 and 63 are the adjoining two arms of the bridge and constitute elements of the time delay tube 57 in which the heater elements 55 and 56 are arranged in heat exchange relation therewith. The time delay tube may, for example, be of the type described in U. S. Patent No. 2,463,805, issued March 8, 1949 to Polye et al. Heater element 55 of tube 57 is connected at one end to one side of a suitable source of supply (not shown) and at its other end by lead 60 with the plate 58 of a discriminator tube 50 while heater element 56 is connected at one end with the opposite end of the source and its other end through lead 61 with plate 59 of discriminator tube 51. Both grids 48 and 49 of tubes 50 and 51 are grounded by way of a grid leak resistor 54 to the negative terminal C— of a suitable D. C. source and connected through a condenser 47 with the plate 46 of a high gain amplifier tube 45. Grid 44 of the latter tube connects by way of a lead 43 with the tap of the variable tapped resistor 41 arranged across secondary winding 73 of transformer 72. For a fuller treatment of this circuit just described, reference is made to copending application Serial No. 90,236 filed April 28, 1949 and assigned to the assignee of the present application.

The secondary winding 36 of mixing transformer 35 is connected by lead 37 to grid 38 of an amplifier 39 whose plate 74 is, for safety purposes, connected to a limiter unit 80. Obviously, unit 80 is not a necessary element but may be eliminated from the circuit. However, unit 80 is desirable to prevent violent maneuvering of the craft or extreme action on the control surfaces should the circuit be accidentally or inadvertently energized when the aircraft is far off course by setting an upper limit on the signal strength that may be passed through it. Such a unit has been fully described in copending application Serial No. 117,476 assigned to the assignee of the present invention.

Grids 75 and 76 of thermionic tubes 77 and 78 are connected by leads 81 and 82 to the output of unit 80. Plate 85 of tube 77 is connected to the aileron surface control channel amplifier 87 while plate 90 of tube 78 is connected to rudder control channel amplifier 92. The amplifying system, servomotor and mechanical transmission may be conventional. One system has been described in aforementioned copending application Serial No. 705,524 and now has matured into Patent No. 2,592,173. As is well known, the ailerons control the roll or banking action of the aircraft about its longitudinal axis. The rudder controls the yaw or action of an aircraft in a lateral plane about the normal vertical axis of the aircraft.

The general hookup of the tubes is conventional; the cathodes being grounded through a resistance, and the plates and screen grids positively biased by a suitable D. C. power source B+. The values of these features will depend upon the operative characteristics of the tubes selected.

The system heretofore described will operate the aircraft under blind landing conditions but the several disadvantages due to the coordinated, smoothly banked turns and the increased sensitivity of the system as it approaches the transmitter are presented.

The novel arrangement overcoming these disadvantages by rendering any turns necessary to put the craft back on course increasingly flatter as the craft nears the ground and by making allowances for the nearness of the craft to the transmitter is illustrated in Figure 1.

In the illustrative embodiment, control is derived from a barometric device denoted generally 103. A conventional switch S connects the glide path receiving radio 10 with the glide path computer and may be connected also to engage simultaneously switch S' though, obviously, they may if desired, be engaged selectively. A circuit 100 completed by switch S' connects solenoid 101 of a solenoid actuated valve V separating line 102 from chamber 140 of barometric device 103. Line 104 connects chamber 141 and line 102 to the atmosphere. Operatively connected to diaphragm 105 for movement therewith is a suitable mechanical movement mechanism 106 to slide taps 107 and 108 on the variable tapped resistances 109 and 110 of battery energized potentiometers 111 and 112. Tap 108 is connected by lead 114 to (1) conductor 115 connected with grid 113 of vacuum tube 31 and (2) lead 118 connected with grid 121 of vacuum tube 77. Tap 107 is connected by lead 123 to (1) lead 124 connected to grid 128 of tube 68 and (2) lead 129 connected to grid 132 of tube 78. Leads 114 and 123 are connected to the respective tubes through a resistance and a grounded capacitance. This is conventional, and while it is not necessary for the conventional battery powered potentiometers 111 and 112, it is desirable for filtering action should some other D. C. power source be employed. The leads 114 and 123 are connected to the taps 108 and 107 so that as atmospheric pressure increases resulting from craft descent with the interior of diaphragm 105 closed off from atmosphere, the diaphragm contracts and moves taps 107 and 108 downwardly whereby the negative biasing effect through leads 115 and 118 to grids 113 and 121 is increased while the negative biasing effect through leads 123 and 124 and 129 to grids 128 and 132 is decreased.

Operation

It may be assumed that an aircraft provided with the automatic steering system of Figure 1 is off to one side of a localizer radio beam, and the deflection of the needle 15 of the cross-pointer meter 14 to one side of zero is constant, i. e., with no rate of change of needle motion. The signal resulting from needle deflection will be of a given amplitude so that it will communicate through leads 19 to modulator 20. Here the relatively weak D. C. signal is developed into a reversible and workable A. C. signal of varying phase and amplitude. It is amplified by tube 23, then conducted by way of transformer 27 and its secondary 28 as well as transformer 35 through leads 37 and the following conductors to the input channel of amplifiers 92 and 87 to deflect the rudder and aileron surfaces to direct the craft toward the beam.

At the same time that the signal, due to needle displacement, is applied to secondary 36 of transformer 35 by way of the secondary 28 of the input transformer 27, it is also applied by way of secondary 29 of the input transformer in series with the secondary 73 of the feed back transformer 72 and across grid 44 of amplifier tube 45. Depending upon the polarity of the displacement signal, either plate 58 of tube 50 or plate 59 of tube 51 will become conductive to heat either element 55 or 56. As a result of the foregoing action, the bridge will become unbalanced whereupon a signal will appear across the bridge output and the primary winding of the feed back transformer in phase opposition to the displacement signal appearing at secondary 73 to cancel the latter. Grid 44 is connected to the tap of variable tapped resistor 41 so that it will be self-sustaining. The displacement and feed back signals being equal and opposite when the deflection of the needle is constant, no rate signal will be applied to the displacement signal appearing at secondary 36 of mixing transformer 35.

Upon application of rudder and aileron in the foregoing manner, the craft will be maneuvered into a turn toward the beam and the needle of the cross-pointer meter will begin a return to zero which position it will attain when the craft crosses the beam. As a result of such needle movement, the displacement signal applied to input transformer 27 will decrease in amplitude. While the signal reduction will appear instantly at secondary 36 of transformer 35, it will not appear, except after a predetermined interval of time defined by the time constant of time delay tube 57, across the primary of the feed back transformer 72. For this reason, the feed back signal will for a time exceed the value of the displacement signal so that a resultant or rate signal will appear at the feed back transformer which will be fed by way of lead 42 to secondary 36 of transformer 35 to be there added in phase opposition with the displacement signal. In this manner the novel circuit hereof provides a damping control for the approach to and capture of the beam by the aircraft so that the craft will not oscillate unduly about the beam. Damping is also provided by the aforementioned circuit when the craft is flying along the beam to prevent hunting or oscillation.

It will be obvious that should the craft during its return to the beam, as a result of side winds, become displaced suddenly further from the beam, the displacement signal at secondary 29 will increase in amplitude so that it will exceed the feed back signal of transformer 72 and the difference thereof will be impressed on the displacement signal at secondary 36 to assist the latter signal in returning the craft to the beam, with the feed back signal eventually exceeding the displacement signal to dampen the system.

The above system is satisfactory for cruising conditions but as explained supra has inherent disadvantages for landing conditions.

Therefore, to obtain automatic control of craft with the improved blind landing characteristics switch S is engaged, thereby placing the glide path computer into action to control craft descent thru its elevator and throttle controls and also engaging switch S', energizing circuit 100, actuating solenoid 101 and closing valve V to seal the air in a portion 140 of line 102. As the aircraft descends, diaphragm 105, due to the increased density of the air at lower altitude, contracts proportionally against the less dense air trapped in chamber 140. Mechanical movement 106 is actuated, moving taps 107 and 108. Movement of tap 107 serves to increase the positive bias on grids 128 and 132 enhancing the signal strength in conductor 91 from plate 90 of pentode 78 to the rudder control and increasing the amplification of the feed back from plate 69 of pentode 68 through conductor 70 to transformer 72. Movement of tap 108 increases the negative bias on grid 121 of pentode 77 diminishing the signal strength to the aileron control, finally cancelling out the signal to the aileron completely as the aircraft approaches the ground. At the same time movement of tap 108 increases the negative bias on grid 113 thereby diminishing the strength of the signal on plate 32 which is ultimately communicated to plates 85 and 90 of pentodes 77 and 78. The bias on grid 113, obviously, reduces the amplification factor of tube 31 so as to provide a constant level of signal to pentodes 77 and 78 for a given displacement even though the signal strength put out by the station increases as the transmitter is approached. Thus aileron control is cut down decreasing the rolling or banking movement as the craft nears the ground while the rudder control is increased to provide the flat turns desired. Also, the strength of the feed back signal along conductor 70 is increased by increased amplification in tube 68 through the action of grid 128 as the craft nears the radio beam transmitters thus resulting in a greater rate of dampening action, consequently in tighter control of the aircraft.

The arrangement of the embodiment shown in Figure 2 is similar to that of Figure 1 except that fewer tubes are employed. A pentode 200 has been substituted for the simple triode 23 of Figure 1. A lead 201 connects control grid 203 with the pressure controlled output lead 114. The modulator output 21 is connected to grid 222 in a similar fashion as to grid 22 in Figure 1. Thus the change in biasing action due to changes in pressure affects transformer 27 directly in Figure 2 whereas it was not so affected in Figure 1. The pentode 31 shown in Figure 1 has been eliminated in the disclosure of Figure 2 so that the output of secondary winding 28 goes directly through leads 9 and 33 to transformer 35. In all other respects the arrangement of Figure 2 is similar to that of Figure 1 in that tube 68 is biased to increase the feed back signal as the craft approaches the radio beam transmitters, tube 77 is biased to reduce the aileron signal and tube 78 is biased to increase the rudder signal. It will also be apparent that the output of tube 200 will be held at a substantially constant level in spite of increasing signal strength as the craft approaches the radio beam transmitters.

The two embodiments of the invention disclosed in the drawings illustrate the control of the directional signal to the aircraft surfaces, the control of the damping signal, the control of the final signal to the aileron surface and the control of the final signal to the rudder surfaces as operating in one coordinated manner. It is obvious, however, that various other combinations involving only one, two or three of the controls, or decreasing and increasing the control of any combination of these controls may be made.

While only two embodiments of the invention have been illustrated and described, various changes and modifications may be made in the form and relative arrangement of the parts and circuits without departing from the scope of the invention. Reference is therefore to be had to the appended claims for a definition of the limits of the invention.

I claim:

1. An automatic steering apparatus for aircraft adapted to fly at various altitudes and having surfaces for controlling the aircraft about the roll and yaw axes thereof, comprising reference means responsive to departure of the aircraft from a predetermined reference for controlling said surfaces to maintain said craft on said predetermined reference, damping means responsive to changes in control of said surfaces for damping the control of said surfaces at a prescribed rate, and means responsive to changes in altitude of said aircraft for modifying the ratio of control between said surfaces by said reference means and the prescribed rate of damping as a function of altitude.

2. In an automatic steering apparatus for an aircraft adapted to fly at various altitudes and having surfaces for controlling the aircraft about the roll and yaw axes, reference means responsive to departure of the aircraft from a prescribed reference for controlling said surfaces, a damping means responsive to changes in the control for said surfaces for damping the control of said surfaces, and means responsive to changes in altitude of said aircraft for selectively modifying the control of said surfaces with decrease in altitude as the aircraft prepares to land so as to decrease the extent of roll for a given departure from said prescribed reference to give increasingly flatter turns and to modify said damping means so as to give tighter control of the craft.

3. In a control system for an aircraft provided with displaceable rudder and aileron surfaces and adapted to fly at varying altitude levels, reference means for developing rudder and aileron control signals in response to departure of the aircraft from a predetermined course and attitude, actuators associated with each of said surfaces for the operation thereof, thermionic means interconnecting said reference means and said actuators for transmitting signals to said actuators for operating the latter, and means responsive to changes in craft altitude levels for selectively varying said signals to said actuators so as to change the ratio of operation between said actuators as a function of altitude level.

4. An automatic steering system for an aircraft provided with movable rudder and aileron surfaces and adapted to fly at varying altitude levels, comprising reference means for developing rudder and aileron control signals in response to a departure of the aircraft from a predetermined course and attitude, and means responsive to a change of altitude of the aircraft for modifying at least one of said control signals to change the ratio of control between the rudder and aileron surfaces in response to said signals as a function of altitude.

5. An automatic steering system for an aircraft provided with movable rudder and aileron surfaces and adapted to fly at varying altitude levels, comprising reference means for developing control signals for the rudder and control signals for the ailerons in response to a departure of the aircraft from a predetermined course and attitude, said signals having amplitudes corresponding to the extent of said departure, and means responsive to a decrease in altitude of the aircraft for varying the relative magnitude of said control signals in opposite senses to provide for increasingly flatter turns as the craft approaches the ground.

6. A blind landing system for an aircraft provided with rudder, aileron and elevator surfaces for guiding the craft along a horizontal flight path and down an inclined glide path, comprising reference means for developing control signals upon departure of the craft from said flight path to displace the rudder and aileron surfaces to return the craft to the flight path, means responsive to said glide path for guiding said craft along said glide path during descent, and means responsive to the descent of said craft for modifying at least one of said first named control signals to decrease the extent of aileron displacement for a given departure of said craft from said flight path.

7. In a control system having a controlling element and a controlled element, a first channel comprising means for operating said controlled element in response to a displacement signal developed by said controlling element, said first channel including means for modifying said signal, a second channel defining a rate developing circuit connected to receive said displacement signal and comprising a device for reproducing said displacement signal in the second channel, means for transmitting the reproduced signal to oppose said displacement signal in the second channel whereby the latter channel will be balanced when said displacement signal is of a constant amplitude and unbalanced when said displacement signal is of varying amplitude, said transmitting means also including means to modify the signal transmitted thereby, means for transmitting the algebraic summation of the two signals of said second channel to the displacement signal of said first channel, means conducting the total signal to the controlled element, including means to modify the signal therein, and means responsive to ambient pressure conditions for operating said signal modifying means.

8. A steering system for an aircraft having rudder and aileron control surfaces and adapted to fly at varying altitudes, said system comprising reference means for controlling said aileron and rudder surfaces in response to departure of the craft from a predetermined datum, and means responsive to an altitude change of said craft as the craft descends for a landing for modifying the ratio of operation of rudder to aileron control surface as a function of altitude whereby the extent of control exercised by the rudder surface is increased while the extent of control exercised by the aileron surface is decreased.

9. A steering system for an aircraft having movable rudder and aileron control surfaces and adapted to fly at varying altitudes, comprising reference means for controlling said aileron and rudder surfaces in a coordination ratio of movement in response to departure of the craft from a predetermined datum, and means responsive to an altitude change of said craft for modifying the coordination ratio between said rudder and aileron control surfaces whereby the extent of control exercised by the rudder surface is increased while the extent of control exercised by the aileron surface is decreased as a function of decrease in altitude.

10. Steering apparatus for an aircraft provided with displaceable surfaces for controlling the craft about the roll and yaw axes to guide said craft along a predetermined course at varying vertical elevations, comprising automatic means responsive to a departure of said craft from said predetermined course and operable for controlling said surfaces to return the craft to said predetermined course, means responsive to vertical elevational changes of said craft, and means actuated by said elevational responsive means for modifying the operation of said automatic means by increasing the control exercised on the craft by one of said surfaces about one axis and decreasing the control exercised by the other of said surfaces about the other axis in response to said departure as a function of the elevational level of the craft.

11. Steering apparatus for a mobile body having surfaces for controlling the body about the roll and yaw axes and adapted to guide said body along a predetermined course at varying elevations, comprising means to normally provide a coordinated ratio of control between said surfaces to maintain the body on said predetermined course, means responsive to changes in ambient pressure resulting from changes in the elevation of said body, and means actuated by said pressure responsive means to change said ratio of control between said surfaces as a function of altitude whereby the control exerted by said rudder surface is increased beyond that normally exerted by the rudder surface as the body descends so as to give increasingly flatter turns as the craft approaches the ground.

12. An automatic steering apparatus for a craft having rudder and aileron surfaces thereon and adapted to fly at varying altitudes, comprising an actuator for each of said surfaces, means for maintaining said craft on a predetermined course in a predetermined attitude including conducting means for conducting actuating signals to said surface actuating means in response to the displacement of said craft from said predetermined course and attitude, means responsive to changes in altitude of the craft, and means actuated by said altitude responsive means for selectively modifying the conduction of said signals by said conducting means to said surface actuators so as to change the ratio of operation between said actuators in response to said displacement as a function of altitude.

13. An automatic steering system for an aircraft provided with rudder and aileron control surfaces, and comprising reference means responsive to departure of the craft from a predetermined guide beam for developing signals to control said surfaces to maintain said craft on said guide beam, said rudder and aileron control normally having a predetermined ratio of control, and means responsive to ambient pressure changes due to changes of altitude of said craft for modifying the ratio of control between said rudder and aileron surfaces as said craft prepares to land so as to obtain increasingly flatter turns as the craft approaches the ground.

14. In a navigation system wherein overlapping lobes of radiant energy are transmitted from a ground station to define a horizontal flight path and an inclined glide path for aircraft, the latter having rudder and aileron control surfaces, said system comprising means on said aircraft adapted to receive energy projected along said respective lobes, actuators for operating said aileron and rudder surfaces, said receiving means including means to energize said actuators in accordance with departure of the craft in a horizontal plane relative to said flight path to maintain the aircraft on the flight path, and means responsive to changes in altitude resulting from descent of the craft along said glide path for diminishing the actuation of the aileron control surface and increasing the actuation of the rudder control surface, whereby, as the craft approaches the ground, any turns due to displacement from the horizontal flight path automatically become flat turns.

15. An automatic steering apparatus for the instrument landing of aircraft having aileron and rudder control surfaces, comprising means carried by the aircraft for receiving a radiated field transmitted from a desired landing station and defining a predetermined path of known shape and position in space for guiding said aircraft to said station, said receiving means including means to actuate said control surfaces to maintain the aircraft on the predetermined path, means responsive to altitude changes of the aircraft in descent for modifying the actuation of said control surfaces whereby, as the aircraft approaches the station, the total control is softened, aileron control is diminished and rudder control increased to give flat turns for correction of the craft onto said predetermined path.

16. A blind landing system for an aircraft provided with movable control surfaces for guiding the craft along a horizontal flight path and down an inclined glide path, comprising reference means for developing a first control signal in response to craft departure from said flight path to operate at least one of said surfaces to maintain said craft on said flight path, means responsive to departure of said craft from said glide path for operating another of said surfaces to maintain said craft on said glide path, means responsive to said first control signal for deriving a damping signal for modifying the operation of said one surface, and means responsive to craft descent along said glide path for progressively increasing said damping signal as the craft descends along said glide path.

17. In an automatic steering apparatus for an aircraft having aileron and rudder surfaces thereon and capable of a cruising condition and a landing condition, means providing a coordination ratio of operation between said surfaces for said cruising condition, means providing a continuously variable ratio of operation between said surfaces for the landing condition of said aircraft, and means to select one of said first and second mentioned means.

18. In an automatic steering apparatus for an aircraft having aileron and rudder surfaces and capable of a cruising condition and a landing condition, first means providing a fixed ratio of operation between said surfaces for the cruising condition, second means providing a variable ratio of operation between said surfaces for the landing condition, and means to select one of said first and second means, said second means including means responsive to change in altitude of said aircraft as it descends for a landing for the varying of said variable ratio.

19. An autopilot system for the control of an aircraft having a receiver for receiving a directional signal from a remotely located transmitting station and transmitting said directional signal to the autopilot, comprising means constituting a part of the autopilot for generating a second signal which is a function of said directional signal, means responsive to said second signal for controlling said aircraft in accordance with the directional signal, damping means responsive to said second signal to produce an opposing signal for controlling said aircraft in accordance with the rate of change of said second signal, and means responsive to changes in altitude of said aircraft to increase said damping signal as said craft descends for a landing so as to give tighter control of the craft.

20. An automatic steering system for an aircraft provided with a movable control surface and adapted to fly at varying altitude levels, comprising reference means for developing a control signal having an amplitude and phase corresponding to the amount and direction of departure of the craft from a prescribed reference for controlling said surface, a damping means also receiving said control signal and adapted to feed back a signal in opposition to said control signal and of a phase and amplitude varying in accordance with the rate of change of said control signal and means responsive to a change of altitude of said craft for varying the relative amplitudes between said signals as a function of altitude.

21. In an automatic steering system for aircraft, a first channel for operating the yaw and roll control surfaces of the craft to maintain the craft on a localizer beam, a second channel for operating the pitch control surface to maintain the craft on a glide path beam, said first channel including means for obtaining a displacement signal corresponding to the displacement of the craft from the localizer beam, means for deriving from said displacement signal a rate signal having a value corresponding to the rate of change of said displacement signal, means combining said displacement and rate signal to provide a signal summation, and means utilizing said signal for operating said yaw and roll control surfaces, means for placing said second channel into operation to maintain the craft on a glide path beam, and means connected with said last named means and operable when said second channel is placed into operation for changing the value of said rate signal so as to give tighter control and for increasing the yaw control surface operation and decreasing the roll control surface operation in response to said signal summation so as to give flatter turns as a function of the descent of the craft.

References Cited in the file of this patent

UNITED STATES PATENTS

| | | |
|---|---|---|
| 2,309,314 | Harshaw | Jan. 26, 1943 |
| 2,387,795 | Isserstedt | Oct. 30, 1945 |
| 2,419,970 | Roe et al. | May 6, 1947 |
| 2,423,337 | Moseley | July 1, 1947 |
| 2,439,044 | Ferrill | Apr. 6, 1948 |
| 2,548,278 | Wirkler | Apr. 10, 1951 |
| 2,592,173 | Noxon et al. | Apr. 8, 1952 |